INVENTOR:
GLEN R. STATON

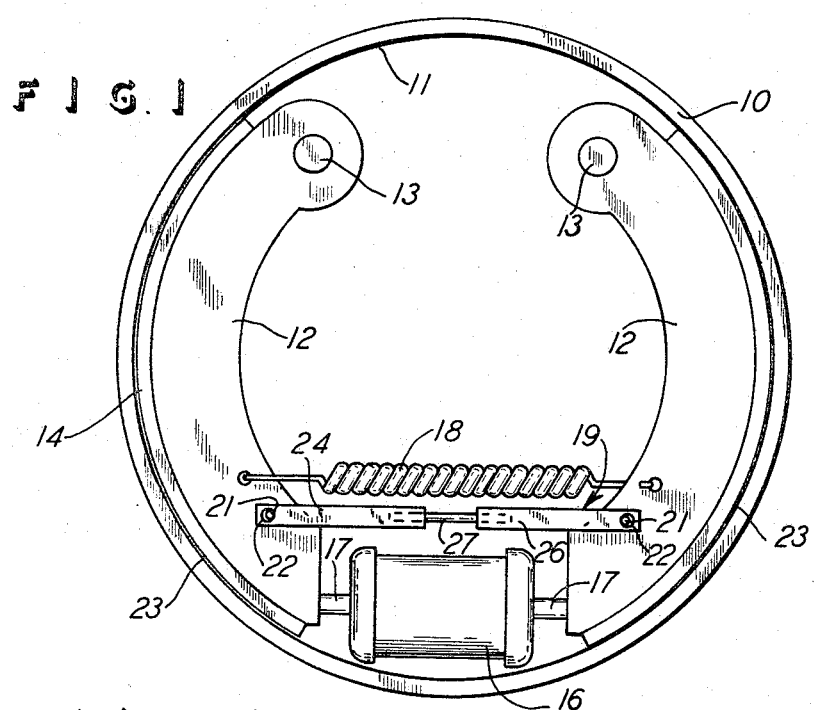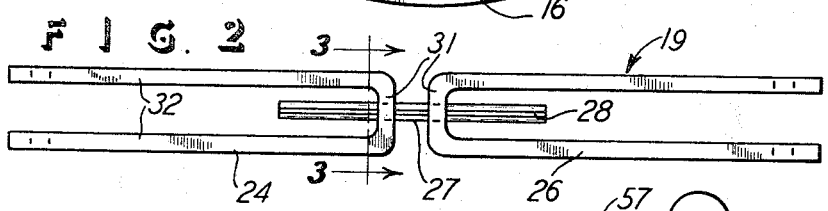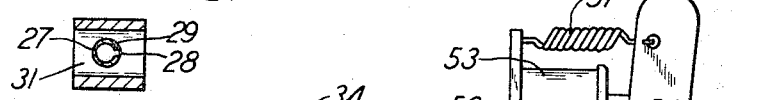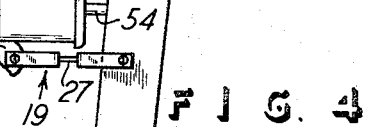

United States Patent Office 3,338,343
Patented Aug. 29, 1967

3,338,343
AUTOMATIC ADJUSTER
Glen R. Staton, Kansasville, Wis., assignor to J. I. Case Company, Racine, Wis., a corporation of Wisconsin
Filed Apr. 8, 1966, Ser. No. 541,311
1 Claim. (Cl. 188—79.5)

ABSTRACT OF THE DISCLOSURE

An automatic adjuster for a brake in which a pair of U-shaped clevises has a lost-motion connection to each shoe of the brake. The clevises frictionally telescopically engage a pin mounted in openings at the end of each clevis.

This invention relates to an automatic adjuster for brakes, clutches, and the like, and, more particularly, it relates to an automatic adjuster for use in automatically setting the desired running clearance between the rotating parts.

Automatic adjusters are already known. These are commonly employed for establishing the clearance between a brake shoe and the brake drum. This clearance is generally held to a minimum so that the shoes will clear the brake drum for free rotation of the drum when the brake is not being applied. Then, when the brake is applied, only a minimum movement of brake pedal or other actuator is required for moving the brake shoes into engagement with the brake drum, as desired. Thus in an automobile, tractor, or other vehicle, only a minimum of displacement of the foot pedal will be required for moving the brake shoes onto the brake drum.

The automatic adjusters heretofore known are relatively complex in their construction and requirements for setting. For instance, some of them require that there be a threaded relationship, such as a bolt and nut, in the automatic adjuster itself, and the threaded part must be set to a desired torque to provide relative movement in the adjuster parts for the adjusting function desired. Also, special washers or like intervening parts, and special structural relationships between the parts are required in previously known adjusters in order to have them serve their purpose of automatic adjustment. Further, such automatic adjustment is commonly accomplished by employment of the brake actuating means itself, commonly found in the form of a hydraulic cylinder, and thus the actuating means must find that the adjuster is suitable and adaptable for its automatic functioning in cooperation with the actuating means commonly employed.

It is a general object of this invention to provide an improved automatic adjuster which is desirably effective and accurate in its function of automatically setting the clearance between rotating parts. In accomplishing this object, the adjuster is also adaptable to be fully useful with the actuating means already commonly employed.

A more specific object of this invention is to provide an automatic brake adjuster which is an improvement over those heretofore known, and which can be easily and readily adapted to brake mechanisms of either the internal or external brake shoe type, or the disc type.

Still another object of this invention is to provide an automatic adjuster which does not require any special assembly attention in that nuts and bolts, or like connectors, need not be set at certain torques in order to have the adjuster operable.

Stil other objects of this invention include the provision of an automatic adjuster which is inexpensive, easily maintained and inspected for operability, easily replaced, reliable in its function, and is not likely to bind or otherwise fail when subjected to adverse weather conditions or like environment.

Other objects and advantages will become apparent upon reading the following description in light of the accompanying drawings, wherein:

FIG. 1 is an elevational view of one embodiment of this invention showing the adjuster adapted to an internal type of brake.

FIG. 2 is an enlarged view of the adjuster shown in FIG. 1, and with parts thereof in a slightly different position.

FIG. 3 is a sectional view taken on the line 3—3 of FIG. 2.

FIG. 4 is an elevational view of another embodiment of this invention and showing the adjuster adapted to an external type of brake.

Figure 5:
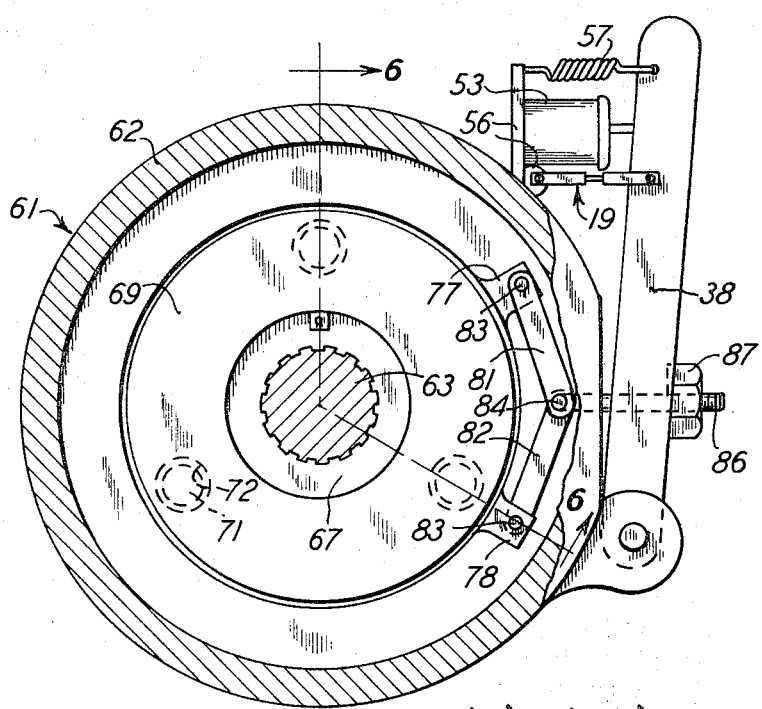
FIG. 5 is an axial view of the adjuster applied to a disc type of brake, and being sectioned along the line 5—5 of FIG. 6.

FIGS. 1, 2, and 3, show an embodiment of the invention adapted to an internal type brake where the brake drum 10 has a circular surface 11 surrounding two brake shoes 12. The shoes 12 are pivotally mounted on pins 13, and they present outer brake linings 14 to the drum surface 11, all in the usual and well-known manner. A hydraulic cylinder 16 is shown intermediate the pivotal ends of the shoes 12, and the cylinder rams 17 will of course move axially for inducing pivotal motion of the two shoes 12 toward and away from the drum surface 11. Conventional and suitable means would of course be employed, though it is not shown, for actuating the shoes 12, in addition to the employment of the cylinder 16. Thus a brake pedal or the like would supply hydraulic fluid to the cylinder 16 for extension of the ram 17 and braking action of the shoes 12, in the usual manner.

A return spring 18 is attached between the shoes 12, by hooking thereto as shown, and the spring of course yields under the force of the hydraulic cylinder 16 when the brakes are applied. When the brake-actuating mechanism is released, the spring 18 will cause the shoes to move toward each other and away from the drum surface 11 to release the brake, all in the usual manner.

An automatic adjuster, generally designated 19 is also connected between the shoes 12 by means of small pins 21 affixed to the shoes 12 as shown. Pins 21 extend into openings 22 located in each end of the adjuster 19. The openings 22 are larger than the cross sectional or diametrical size of the pins 21 so that there is actually a lost motion in the relative movement between the shoes 12 and the adjuster 19. Thus FIG. 1 shows that the spring 18 is holding the shoes 12 inwardly toward each other, and this causes the pins 21 to come to the inside edges of the enlarged openings 22. The pins have clearance between their outer sides and the outer edges of the holes 22, as shown. This clearance is adequate so that energizing of the cylinder 16 will displace the brake shoes 12 into firm contact with the drum surface 11 to effect the braking action. This action is thus effected without having the pins 21 necessarily move beyond the limit of the openings 22. That is, the pins 21 do not pull on the adjuster 19 in the normal operation.

However, when the brake shoes 12, and particularly their outer surfaces 23, which are the brake linings, do not move into firm contact with the drum surface 11 during braking action, then the adjuster 19 will automatically extend or adjust to permit the shoes 12 to move into contact with the drum surface 11, as desired. This of course is the automatic adjustment feature so that the adjuster permits the shoes to move as needed and in response to wear of the linings 23 and the like.

Of course it will be further noted that the adjuster 19 actually resists the force of the return spring 18 so that it simply permits the shoes 12 to move away from the drum surface 11 for a running clearance therewith and yet keep the brake shoes 12 in a position so that only a small movement of the brake actuator, such as the brake pedal and the cylinder 16, is required for the braking action.

An important part of this invention is the particular construction of the adjuster 19 so that it can be easily set in the desired adjusted position, and this is effected by exact alignment of the adjuster 19 between the shoes 12. That is, there is no offset of the adjuster 19 with respect to the plane of the shoes 12, and thus there is no binding due to cocking of the adjuster 19. Further, the adjuster 19 will be capable of automatically extending, in a manner hereinafter described and for the purpose heretofore mentioned, and it will not require special assembly such as torquing of nuts and bolts in order to effect the automatic adjustment.

Thus FIG. 2 shows the adjuster 19 to be comprised of two clevises 24 and 26, and an interconnecting roll pin 27 having an elongated slot 28 therein.

FIG. 3 shows the construction of the pin 27 which is slotted at 28 to provide a telescopic and snug sliding fit by extending through openings 29 in the respective clevises intermediate or cross-piece portions 31. Of course the respective clevises' legs 32 are shown attached to the brake shoes 12 by the means of the pins 21, as described. Thus the force of friction of the roll pin 27 in the clevises 24 and 26 is such that the spring 18 does not overcome the extended position of the adjuster 19. However, the cylinder 16 can overcome the frictional force and thereby automatically extend the adjuster 19, as desired. This therefore provides for a simple and extremely reliable automatic brake adjuster.

FIG. 4 shows the adjuster 19 applied to an external brake arrangement. Here a drum surface 33 is surrounded by the brake shoes 34 and 36 which present their respective linings 37 to the drum surface 33. Of course movement of the shoes 34 toward the surface 33 will effect the braking action. To achieve this movement, a lever 38 is shown mounted on a pivot pin 39 secured in a frame piece 41. Movement of the lever 38 away from the shoes 36 will axially displace a rod 42, affixed to the lever 38 by a nut 43, and this will cause pivotal motion in the links 44 and 46 which are connected to the rod 42. Thus the rod 42 has a pin 47 which extends through an elongated slot 48 in each of the links 44 and 46, and the latter are pivotally mounted on the frame by means of pins 49. Thus the brake shoes will be moved toward each other when the rod 42 is moved to the right in FIG. 4, and as the links 44 and 46 tend to move counter-clockwise and clockwise, respectively, about their mounting pins 49. The links in turn are connected to the respective shoes by pins 51 and 52 so that they pull on the shoes for effecting the braking action desired.

Again a hydraulic cylinder 53 is shown connected by means of a rod 54 to the actuator or lever 38 to pivot the latter as explained. The cylinder 53 is mounted on the frame piece 56, as required. Also, the adjuster 19 is anchored on the frame piece 56 at one end of the adjuster, and the oposite end of the adjuster is pinned to the lever 38. Thus the small pin and large opening connection, that is the lost motion connection, is again presented in the mounting of the adjuster 19, as explained in connection with FIG. 1.

Also, the adjuster's roll pin 27 is shown in FIG. 4, and it again serves the same purpose heretofore described. This arrangement therefore permits a return spring 57 to move the lever 38 to a return position which causes the brake shoes 34 and 36 to present a running clearance with the brake drum 33. Here again the adjuster 19 limits the return movement of the actuator 38 and thereby limits the clearance of the brake shoes 34 and 36 with respect to the brake drum 33, as desired.

The action of the adjuster 19 need be only adequate to withstand the return force of the spring 57 so that the spring cannot shorten the respective length of the adjuster 19. To further assure that the adjuster will adequately respond to the brake actuating force created by the hydraulic cylinders 16 and 53, the roll pin can be made of a stainless steel, and the clevises 24 and 26 can be cadmium plated links or members. When the brakes are relined, or when anything is otherwise reset, the adjuster may be forced back to its foreshortened or original position, or it may even be readily replaced since it is relatively inexpensive and easily assembled with the remainder of the brake mechanism.

Figure 6:
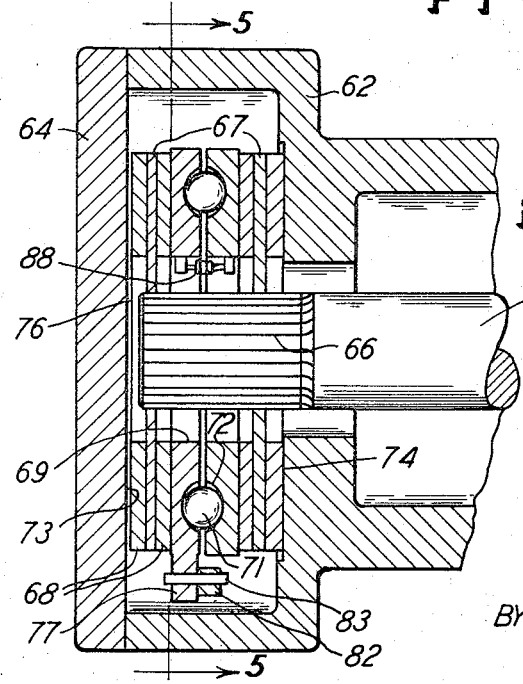
FIG. 6 is a sectional view taken on the line 6—6 of FIG. 5.

FIGS. 5 and 6 show the automatic adjuster 19 utilized with the return spring 57 and actuator 53 in its application to a disc-type of brake, generally designated 61. The brake 61 is in a housing 62 which surrounds the rotatable shaft 63. An end cover 64 may be suitably bolted to the housing 62. The shaft 63 is shown to be splined at 66 to rotatably carry discs 67. Additional brake discs 68 may be secured to the disc 67 to rotate therewith, and these discs 67 and 68 exist on both sides of actuating discs 69. The discs 69 are movable toward and away from each other by means of balls 71 freely disposed within cam type openings 72. Thus when the discs 69 are slightly rotated in opposite directions with respect to each other, the balls 71 will ride on the cam surfaces 72 to spread the discs 69 apart, and this causes the brake discs 68 to become frictionally tight with the surfaces 73 and 74. This is of course a conventional type of disc brake utilizing the conventional ball 71 and cam surfaces 72 for the well-known action of spreading the discs apart against stationary surfaces 73 and 74. It will be noted that the disc's surface 76 is slightly spaced from the stationary surface 73, and this spacing is again one which is to be maintained by means of the automatic adjuster 19.

The discs 69 have projections 77 and 78 which are respectively attached to links 81 and 82 by means of pins 83. Further, the links 81 and 82 are secured together by a pin 84. The pin 84 is then connected to a threaded shaft 86 having a nut 87 which makes the connection between the shaft 86 and the actuating lever 38, as in FIG. 4.

Thus, when the actuator 53, it being a hydraulic cylinder, is extended, the lever 38 retracts the pin 86 to pull on the links 81 and 82 and thereby rotate the discs 69 in the opposite direction, as desired and mentioned before. This causes the braking action desired. A return spring 88 is shown in FIG. 6 to be connected between the discs 69 so that when the lever 38 is in the relaxed position, the discs 69 will again move toward each other to the limit set by the ball 71, all in the customary manner of the operation of a disc-type brake.

Thus the automatic adjuster 19 may be applied to either the drum-type brake or the disc-type brake, and of course it could also be applied to clutches or the like where two relatively rotatable parts are involved.

While specific embodiments of this invention have been shown and described, it should be obvious that certain changes could be made in the embodiments and the invention should therefore be determined only by the scope of the appended claim.

What is claimed is:

In a brake mechanism of the type including pivotal brake shoes movable toward and away from each other under the influence of an actuator and a return spring, the combination comprising an automatic adjuster operatively connected to said shoes in a lost-motion connection such that said return spring can move said shoes toward each other in the absence of any movement of said adjuster and to a limit position of abutment with said adjuster, said adjuster being comprised of a roll pin and a pair of U-shaped clevises each including two legs and a portion intermediate said legs and with said intermediate portions each having a hole therethrough extending parallel to said legs, said roll pin being telescopically disposed in said hole in said intermediate portion of each of said U-shaped clevises and being snugly slidably extendable from each of said clevises in response to a force exerted by said actuator on said adjuster in moving said shoes, and said roll pin being sufficiently frictionally telescopically retained in said clevises to hold said shoes in said limit position against the force of said return spring, said clevises being oriented with said actuator and said spring to be axially parallel thereto for receiving balanced forces to be free from canting.

References Cited

UNITED STATES PATENTS

| | | | |
|---|---|---|---|
| 1,825,555 | 9/1931 | Stern | 188—79.5 |
| 3,032,143 | 5/1962 | Burnett | 188—196 X |
| 3,057,439 | 10/1962 | House et al. | 188—79.5 |
| 3,195,689 | 7/1965 | Ryskamp | 188—79.5 |

DUANE A. REGER, *Primary Examiner.*